(12) United States Patent
Pawar et al.

(10) Patent No.: US 9,213,717 B1
(45) Date of Patent: Dec. 15, 2015

(54) MANAGING CONCURRENT I/OS IN FILE SYSTEMS

(75) Inventors: Sitaram Pawar, Shrewsbury, MA (US); William Davenport, Burlington, MA (US); Ivan Basov, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 811 days.

(21) Appl. No.: 13/247,753

(22) Filed: Sep. 28, 2011

(51) Int. Cl.
*G06F 17/30* (2006.01)

(52) U.S. Cl.
CPC ... *G06F 17/30171* (2013.01); *Y10S 707/99938* (2013.01)

(58) Field of Classification Search
CPC .................. G06F 17/30171; Y10S 707/99938
USPC ............................. 707/704, 999.008; 711/150
See application file for complete search history.

(56) References Cited

U.S. PATENT DOCUMENTS

| 7,822,728 | B1* | 10/2010 | Chandler et al. | 707/704 |
| 2006/0020752 | A1* | 1/2006 | Schnapp et al. | 711/113 |

* cited by examiner

*Primary Examiner* — Gary W Cygiel
(74) *Attorney, Agent, or Firm* — Krishnendu Gupta; Deepika Bhayana

(57) ABSTRACT

A method is used in managing concurrent I/Os in file systems. A first and second I/O requests are received. The first I/O request is directed to a first portion of a file and the second I/O request is directed to a second portion of the file. A first range lock for the first portion is obtained and a second range lock for the second portion is obtained. The first and second I/O requests are performed concurrently. The second I/O request starts performing I/O on the second portion of the file before the first I/O request finish performing I/O on the first portion of the file.

20 Claims, 12 Drawing Sheets

MANAGING CONCURRENT I/OS IN FILE SYSTEMS

BACKGROUND

1. Technical Field

This application relates to managing concurrent I/Os in file system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

File systems typically include metadata describing attributes of a file system and data from a user of the file system. A file system contains a range of file system blocks that store metadata and data. A user of a file system accesses the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in an hierarchy depending upon the size of a file where each level of indirect blocks includes pointers to indirect blocks at the next lower level.

Generally, data and metadata of a file of a file system read from a disk and written to a disk may be cached in a volatile memory such as a system cache of a data storage system. Caching of data and metadata of a file implies that read operations read data and metadata of the file from the volatile memory, rather than from a disk. Correspondingly, write operations may write data and metadata of a file to the volatile memory rather than to a disk. Data and metadata of a file cached in the volatile memory is written to the disk at intervals determined by an operating system of the data storage system, which is referred to as flushing of a cache. Flushing of a cache is triggered at a determinate time interval. Caching data and metadata of a file of a file system in a volatile memory improves performance of the file system as accessing data from a disk involves an I/O operation to a disk which is slower than accessing data from the volatile memory.

A write I/O request using a "file sync" option requires that a write operation directed to a file writes both data and metadata immediately to a disk rather than incurring a delay. However data and metadata may still be written into a cache. On the other hand, a write I/O request using a "data sync" option requires that data is written immediately to a disk but metadata may be cached and flushed to the disk at a later time.

Data consistency problems may arise if multiple clients or processes have concurrent access to read-write files. Typically write synchronization and file locking have been used to ensure data consistency. For example, the data write path for a file has been serialized by holding an exclusive lock on the file for the entire duration of creating a list of data buffers to be written to disk, allocating the actual on-disk storage, and writing to storage synchronously. Unfortunately, these methods involve considerable access delays due to contention for locks not only on the files but also on the file directories and a log used when committing data to storage.

In order to reduce these delays, a file server may permit asynchronous writes in accordance with version 3 of the Network File System (NFS) protocol. However, asynchronous writes and range locking alone do not eliminate access delays due to contention during allocation and commitment of file metadata. A Unix-based file in particular contains considerable metadata in the inode for the file and in indirect blocks of the file. The inode, for example, contains the date of creation, date of access, file name, and location of the data blocks used by the file in bitmap format. The NFS protocol specifies how this metadata must be managed. In order to comply with the NFS protocol, each time a write operation occurs, access to the file is not allowed until the metadata is updated on disk, both for read and write operations. In a network environment, multiple clients may issue simultaneous writes to the same large file such as a database, resulting in considerable access delay during allocation and commitment of file data and/or metadata.

Further, in order to maintain a file system in a consistent state during concurrent writes to a file of the file system, a data storage system maintains file system data structures in a random access memory of the data storage system. To enable recovery of the file system to a consistent state after a system crash, the data storage system writes file metadata to a journal (e.g., file system transaction log) in a disk array during the commit of certain write operations to the file system.

SUMMARY OF THE INVENTION

A method is used in managing concurrent I/Os in file systems. A first and second I/O requests are received. The first I/O request is directed to a first portion of a file and the second I/O request is directed to a second portion of the file. A first range lock for the first portion is obtained and a second range lock for the second portion is obtained. The first and second I/O requests are performed concurrently. The second I/O request starts performing I/O on the second portion of the file before the first I/O request finish performing I/O on the first portion of the file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
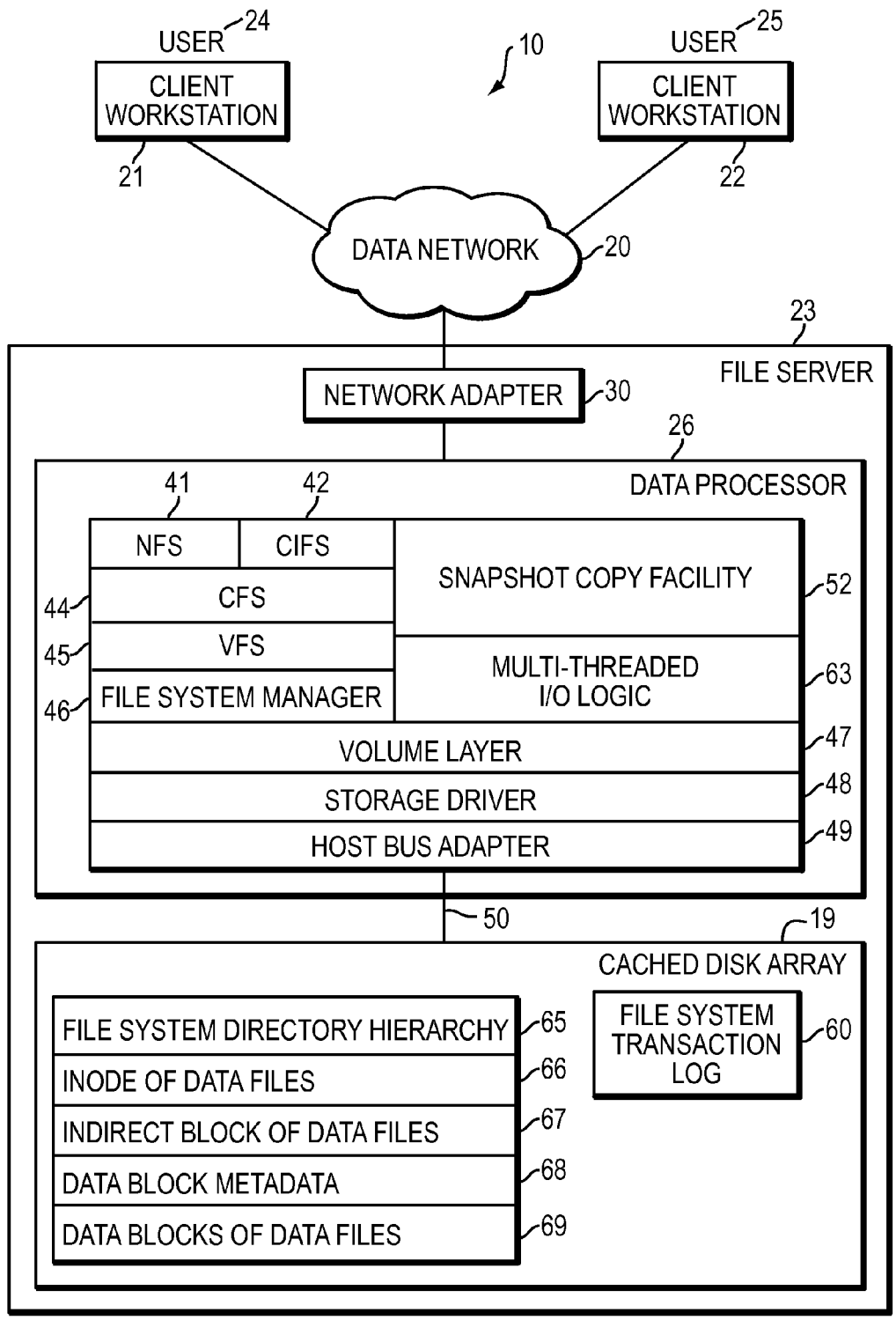
FIG. 1 is an example of an embodiment of a computer system that may utilize the techniques described herein.

Described below is a technique for use in managing concurrent I/Os in file systems, which technique may be used to provide, among other things, receiving a first and second I/O requests, wherein the first I/O request is directed to a first portion of a file and the second I/O request is directed to a second portion of the file, obtaining a first range lock for the first portion and a second range lock for the second portion and performing the first and second I/O requests concurrently such that the second I/O request starts performing I/O on the second portion of the file before the first I/O request finish performing I/O on the first portion of the file.

Generally, an I/O operation (e.g., read request, write request) directed to a file may either be a cached I/O or an uncached I/O. Typically, in case of a cached I/O operation, data associated with the cached I/O is cached in a volatile memory (e.g., a buffer cache pool) of a data storage system. In such a case, a write I/O request is executed by writing the data to a buffer of a buffer cache pool and writing the contents of the buffer to a persistent storage either before returning a successful acknowledgement to a client or at a later time based on whether the write I/O request is a stable write request or an unstable write request. Further, in such a case, a read I/O request is executed by reading data from a persistent storage into a buffer of the buffer cache pool if the data is not already cached and completing the read I/O request by reading the data from the buffer.

Conventionally, in a case of a cached I/O, read and write I/O requests are serialized using file level exclusive and shared locks respectively in such a way that only one client may write to a file at any given time. Generally, a cached I/O is the default mode for a write I/O request which is based on NFS version 3 protocol. However, applications that access large file systems (such as data bases, virtual images, email data) use an uncached I/O operation for accessing data stored in such large file systems. Typically, when a file system is mounted with an option indicating an uncached I/O operation, a read I/O request is processed in a same way as a read I/O request of a cached I/O operation is processed. However, in such a case, a write I/O request (also referred to as "uncached write I/O") writes data directly to a file system stored on a persistent storage (e.g., disk). An uncached write I/O request does not update any in-memory data structures. Further, an uncached write I/O operation is serialized using a file level shared lock and a block level lock. If a file block on a persistent storage includes an updated version of data compared to data stored in an in-memory buffer (e.g., a buffer cache block of a buffer cache pool) associated with the file block indicating that the in-memory buffer is dirty, an uncached write I/O operation first flushes contents of the dirty in-memory buffer to the persistent storage before writing data associated with the uncached write I/O operation in order to ensure that a single location on the persistent storage stores the up-to-date data for the file block. Typically, a dirty buffer results from an unstable (also referred to as "asynchronous") write operation. Generally, buffers that cache data for file blocks to which write I/O requests are targeted become stale indicating that the buffers do not include recent up-to-date data because an uncached write I/O request bypasses writing to an in-memory buffer and directly performs the uncached write I/O operation on a persistent storage. Thus, an uncached write I/O operation invalidates an in-memory buffer that includes data associated with a file block to which the uncached write I/O operation is directed to. Further, an uncached write I/O operation may be a sector aligned write operation indicating that a file offset at which the write operation is performed aligns with an address at which a sector of a disk starts (such as multiple of 512 bytes), and the amount of data to be written as part of the uncached write I/O operation aligns with a size of the sector of the disk. Further, typically a write I/O operation may be a stable write or an unstable write. In case of an unstable write I/O operation, a data storage system does not commit data associated with the unstable write I/O operation to a persistent storage before acknowledging completion of the write I/O request to a client but writes data to an in-memory buffer in a volatile memory cache and flushes the data to the persistent storage at a later time. On the other hand, in case of a stable write I/O operation, a data storage system must commit data to a persistent storage before acknowledging completion of the write I/O request to a client.

Conventionally, only a single write operation is permitted on a file of a file system at a time because a write operation uses a file level lock when writing data to the file thereby locking the entire file and blocking any other write operation that may be issued by clients at the same time. Further, conventionally, in such a system, concurrent write I/O operations are allowed only in case of an uncached I/O which is not a default option for a write I/O operation on a file system and the default option may not be used by every file system. Further, in such a conventional system, a write I/O operation must be aligned with a size of a sector on a disk in order to execute write I/O operations concurrently on the disk. Further, in such a conventional system, a single set of locks (e.g., range lock) is used for a write I/O operation to a region of a file such that a subsequent write I/O operation that is directed to the same region of a file or a different region of the file must wait until data associated with the write I/O operation has been flushed to a disk. Thus, in such a conventional system, a serialization mechanism that is used for concurrent write I/O requests performs at a disk level and is applicable only in case of an uncached read or write I/O request that must be sector aligned. Additionally, in such a conventional system, a system cache is not created when concurrent write I/O operations are performed on a file system because an uncached write I/O operation is directly performed on a persistent storage without storing data in buffers of a volatile memory. As a result, in such a conventional system, a subsequent read I/O operation must perform an I/O operation on the persistent storage in order to read the data associated with the read I/O operation.

By contrast, in at least some implementations in accordance with the current technique as described herein, multiple cached I/O operations may be performed in parallel thereby allowing execution of non-overlapping write I/O requests concurrently. Further, in at least one embodiment of the current technique, a range lock is used to serialize access to a file of a file system such that an I/O operation (such as read, write) may be performed on a region (also referred to as "extent") of the file during a time a concurrent I/O operation is being performed on another region of the file of the file system. Thus, in at least one embodiment of the current technique, write I/O requests may be performed concurrently on a file using a default option of cached I/O thereby improving I/O performance of the file and improving response times for synchronous and asynchronous I/O operations (e.g., read, write). Further, in at least one embodiment of the current technique, performing concurrent I/Os on a file improves performance of an uncached write I/O operation (e.g., stable write, unstable write) such that the uncached I/O operation performs at par with an uncached I/O operation in case of a large file using a default mount option. Further, in at least one embodiment of the current technique, a background process is used to flush dirty in-memory buffers created by asynchronous concurrent write I/O operations thereby reducing latency of the asynchronous write I/O operations. Further, in at least one embodiment of the current technique, a client issuing an I/O request based on a protocol (such as CIFS, NFS) may issue multiple read and write I/O requests to a file concurrently.

Further, in at least some implementations in accordance with the technique as described herein, the use of the managing concurrent I/Os in file systems technique can provide one or more of the following advantages: improving I/O performance for read and write I/O operations on a large file by executing the read and write I/O operations concurrently, increasing write throughput and write latency by increasing a number of write operations that may be performed concurrently on a persistent storage.

In some embodiments, the current technique can be used to improve I/O performance in a case in which a data storage system such as a file server maintains large file systems (e.g., a virtual machine image, a virtual machine device, large data bases). Typically, large file systems such as virtual images and devices are accessed by file system protocols (e.g., NFS, CIFS, iSCSI) as a disk and updated at a rapid pace. However, write I/O operations on such large file systems often includes modification of existing contents of files of such large file systems, and/or writing data to a portion of a storage that is pre-allocated for such large file systems. Further, in such a case, applications that access such a large file system update contents of a file of such large file system by writing to different regions of the file. Thus, in such a case, if using a conventional technique, updates to the file as part of each write I/O operation performed on the file may not be performed concurrently. Therefore, using the conventional technique in such a case may result into a high write latency and a low I/O performance when cached I/O operations are performed on files of the large file system. By contrast, in such a case, the current technique as described herein can be used to improve I/O performance and decrease write latency by executing I/Os concurrently on different regions of a large file system.

Referring now to FIG. 1, shown is an example of an embodiment of a data storage system that may be used in connection with performing the technique or techniques described herein. The data storage system 10 includes a data network 20 interconnecting clients 21, 22 and a data storage system such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 20 via a data transmission protocol such as TCP/IP. The data processor 26 is programmed with a Network File System (NFS) module 41 for supporting communication with network clients over the data network 20 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The snapshot copy facility 52 performs a copy-on-first-write to each block in a production volume, in order to save an old version ("before image") of the changed block in a snapshot volume. Details regarding such a snapshot copy facility 52 are found in the following patent publications: Armangau et al., "Instantaneous restoration of a production copy from a snapshot copy in a data storage system," U.S. Pat. No. 6,957,362 issued Oct. 18, 2005; Raman et al., "Replication of Remote Copy Data for Internet Protocol (IP) Transmission," U.S. Patent Application Publication No. US 2003/0217119 A1, published Nov. 20, 2003; Armangau et al., Replication of a Snapshot Using a File System Copy Differential," U.S. Patent Application Publication No. US 2004/0267836 published Dec. 30, 2004; Armangau et al., Data Recovery with Internet Protocol Replication With or Without Full Resync," U.S. Patent Application Publication No. US 2005/0015663 A1, published Jan. 20, 2005; and John Hayden et al., "Internet Protocol Based Disaster Recovery of a Server," U.S. Published Patent Application No. 2005-0193245 published Sep. 1, 2005; all of which are incorporated herein by reference.

The data network 20 may be any one or more of a variety of networks or other type of communication connections as known to those skilled in the art. For example, the data network 20 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 1, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 1 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. Further, in at least one embodiment of the current technique, multi-threaded logic is used to enable data storage system 10 perform concurrent I/O operations on a file of a file system.

Figure 2:
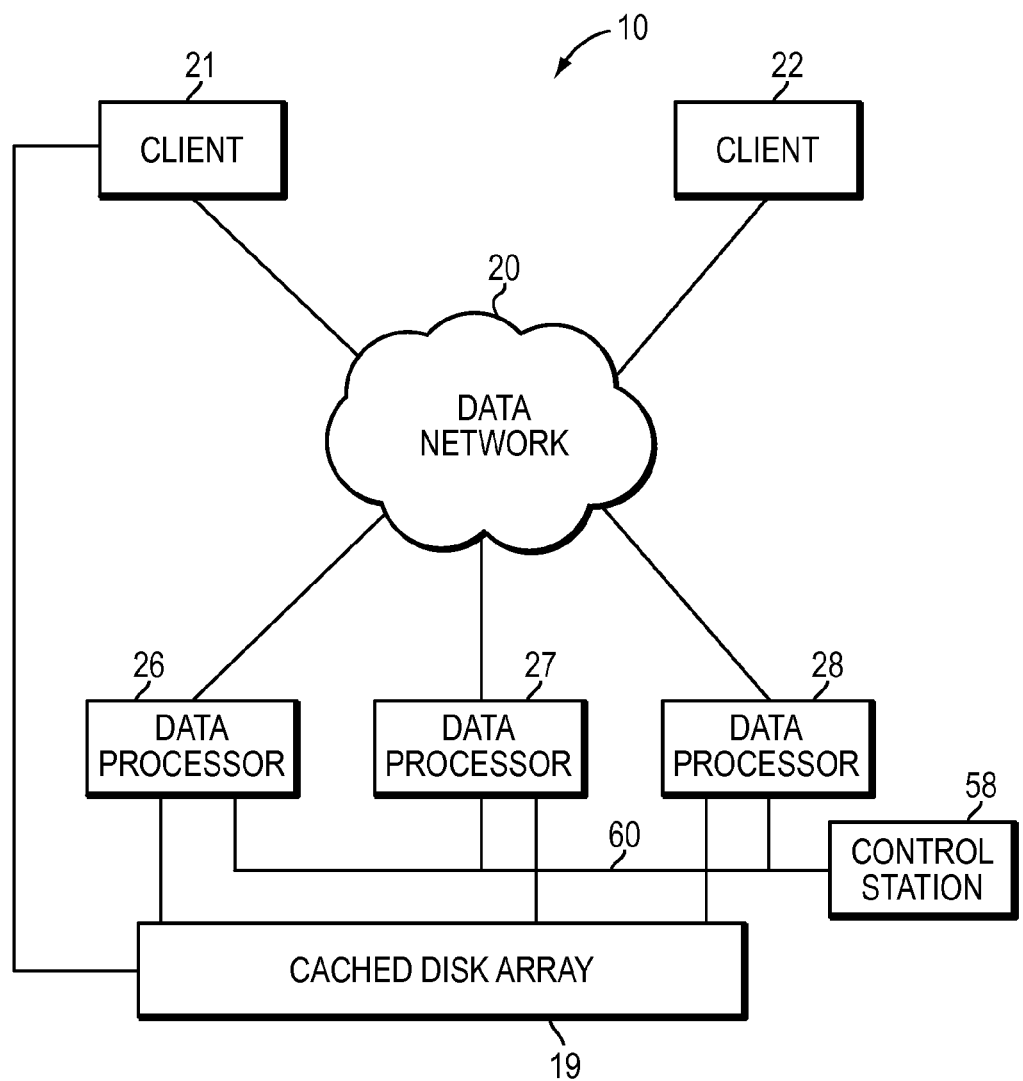
FIGS. 2-7 are diagrams illustrating in more detail components that may be used in connection with techniques herein.

Referring now to FIG. 2, shown is the network file server 23 of FIG. 1 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 3:
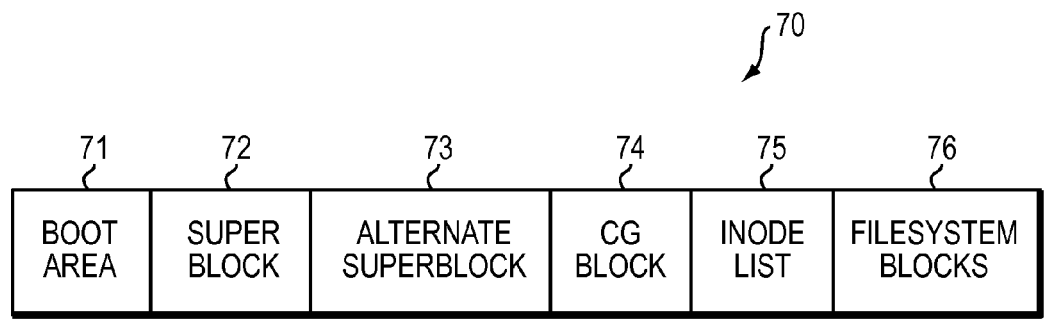

Referring to FIG. 3, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file.

Figure 4:
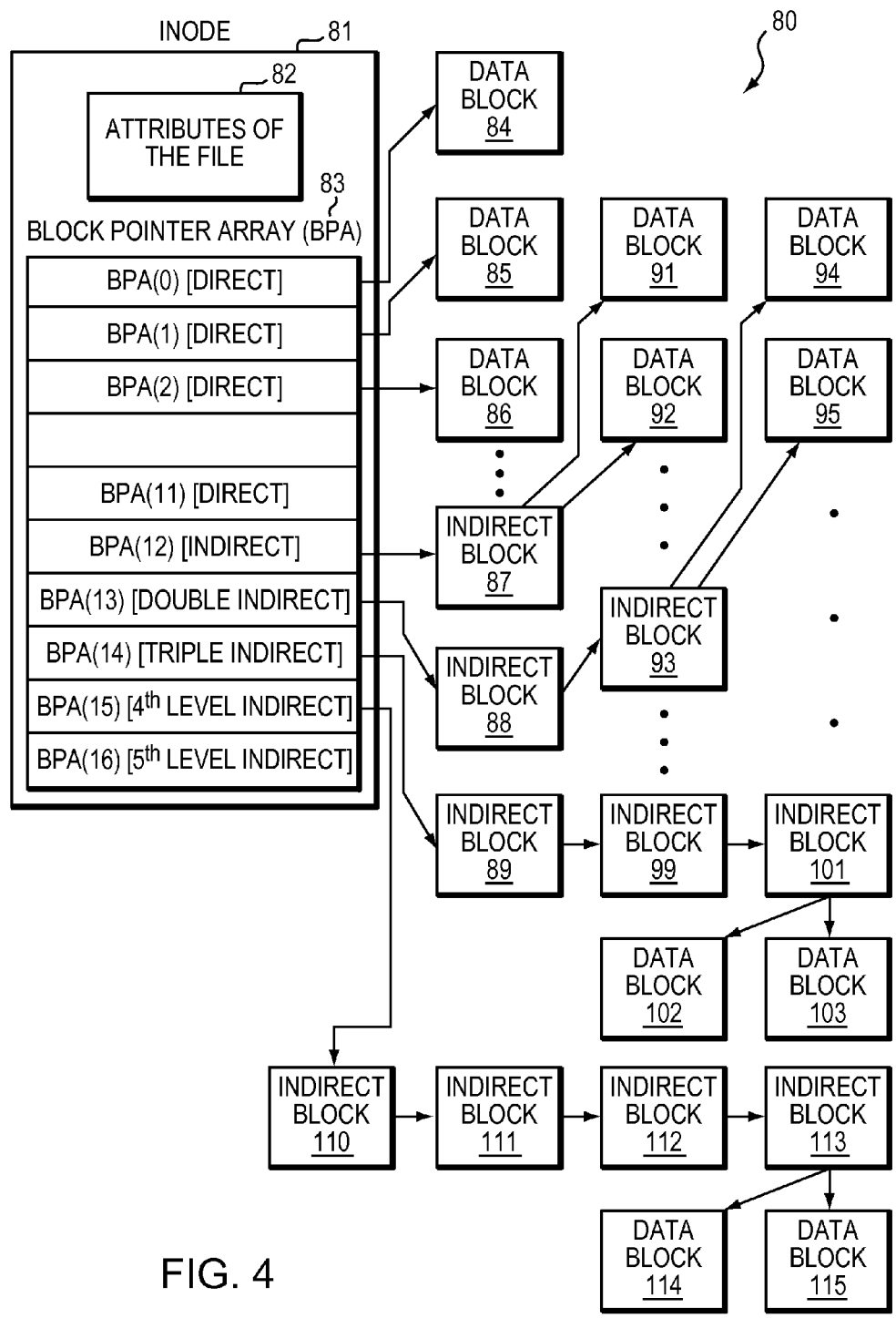

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115.

A file is uniquely identified by a file system identification number in file server 23. Each data block of a file is referenced by a logical block number and/or file system block number. A file system block number of a file refers to a data block by relative position of the data block inside the file. A logical block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log for a file system offers increased reliability, because the file system transaction log may replicate some or all of the file system data and metadata which can be applied to the file system at a later time in order to make the file system metadata consistent with changes applied to data of the file system.

Typically, a file system transaction log only stores changes to metadata (such as inodes, directories, allocation maps) of a file system. If file server 23 shuts down without a failure, the file system transaction log can be discarded, because the file system stored on a persistent storage in such a case is consistent and includes all metadata changes stored in the file system transaction log. However, when file server 23 shuts down due to a failure, the file system transaction log is used to rebuild the file system in order to restore the file system to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in a file system transaction log to a persistent storage is known as "replay of a file system transaction log".

Figure 5:
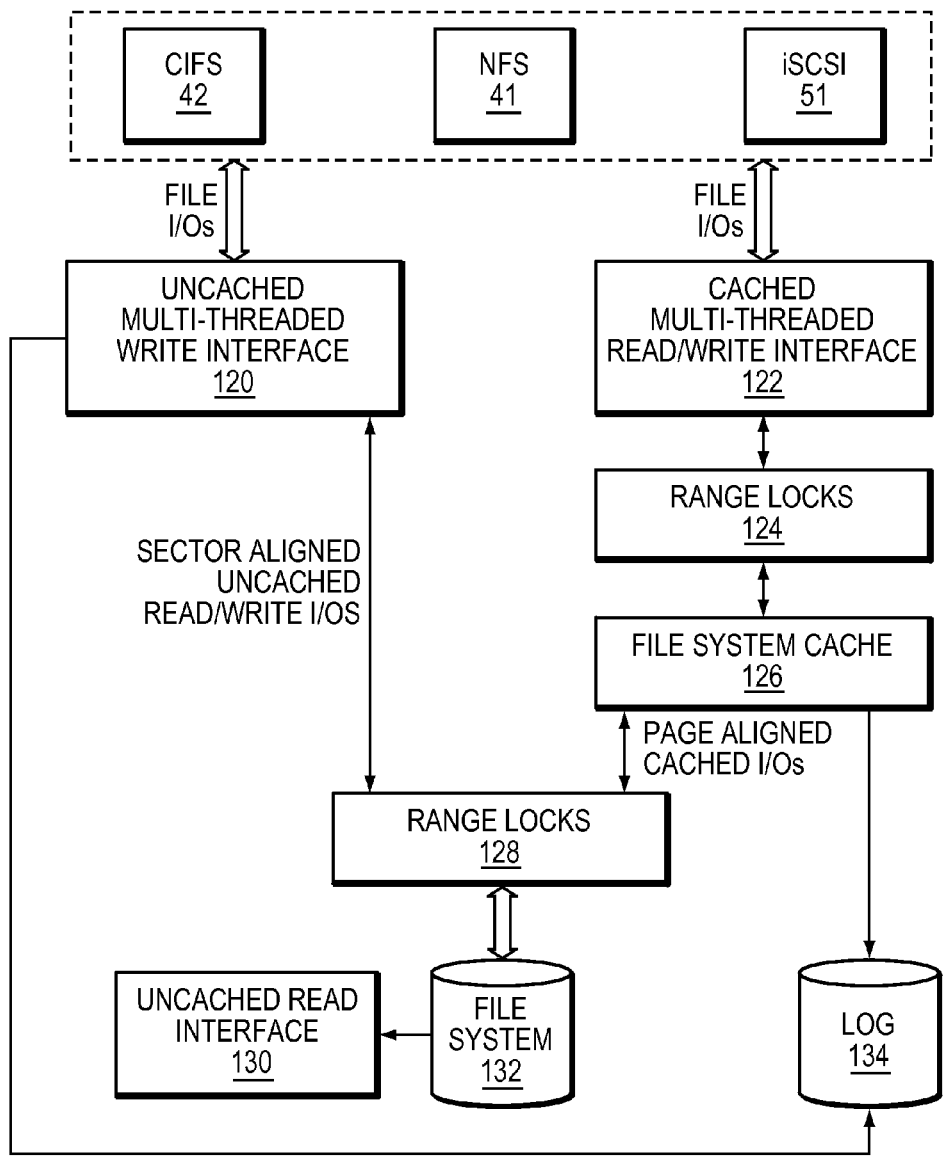

Referring to FIG. 5, shown is a more detailed representation of components that may be included in an embodiment using the techniques herein. In at least one embodiment of the current technique, a range lock is used to protect a range of a file to which an I/O operation is directed. Further, in at least one embodiment of the current technique, if multiple write I/O requests are all targeted to the same range of a file, the multiple write I/O requests are managed in such a way that data associated with the multiple I/O write requests are written to a persistent storage in an order in which the multiple write I/O requests have been sent to a data storage system. Further, a first range lock coordinates writing data to a system cache (e.g., file system cache 126) that exists in a volatile memory of a data storage system and a second range locks coordinates writing data to a persistent storage (e.g., disk). Thus, a range lock is a locking mechanism that allows multiple clients to access a single file of a single file system such that each client of the multiple clients may access a different part (also referred to as "range") of the file of the file system. Further, a range lock may be acquired in an access mode such as a shared mode or an exclusive mode. A range lock that is acquired in a shared mode is referred to as a shareable range lock. Thus, a shareable range lock allows multiple clients (also referred to as "users") to access the same part of a file of a file system such that the multiple clients may read data from the file concurrently. Further, in at least one embodiment of the current technique, a range lock 124 may be acquired at a page granularity (e.g., 8 kilobytes (KB)) such that a part of file represented by an in-memory buffer in file system cache 126 may be accessed by acquiring the range lock that protects the in-memory buffer. As a result, if a new write I/O request is directed to the same in-memory buffer that has been locked by the range lock, the write I/O request waits until the range lock is released. Similarly, a range lock 128 may be acquired at a block granularity (e.g., 8 kilobytes (KB)) such that a part of file represented by a file system data block in file system 132 stored on a persistent storage may be accessed by acquiring the range lock 128 that protects the file system data block. As a result, if a new write I/O request is directed to the same file system data block that has been locked by the range lock 128, the write I/O request waits until the range lock 128 is released.

Further, in at least one embodiment of the current technique, a range lock may be used for managing cached and uncached write I/O requests such that the use of the range lock allows concurrent execution of cached and uncached write I/Os that are non-overlapping and thus does not write data to overlapping regions of a file system. Further, in at least one embodiment of the current technique, write I/O requests that writes data to overlapping regions of a file system may be serialized using a range lock in order to preserve the sequence in which the overlapping write I/O requests have been issued by clients. Thus, in at least one embodiment of the current technique, two sets of range locks are used. A first set of range locks 124 protects data that is written to an in-memory buffer of file system cache 126 in a volatile memory of file server 23. A second set of range locks 128 protects data that is flushed to file system 132 stored on a persistent storage. Further, in at least one embodiment of the current technique, a range lock may protect a range of a file of a file system such that the location indicated by the range is based on a logical offset of the file.

Referring back to FIG. 5, in at least one embodiment of the current technique, a client access file system 132 using any one of protocols (such as CIFS 42, NFS 41, and iSCSI 51) by issuing an I/O request (e.g., read, write). Further, an I/O request may be a block aligned request such that the offset at which data is written as part of the I/O request aligns with the size of a data block (e.g., 8 Kilobytes (KB)). Further, as described above herein, two instances of a range lock manage concurrent I/Os in a file system such that range lock 124 manages concurrent I/Os to file system cache 126 and range lock 128 manages concurrent I/Os to file system 132 stored on a persistent storage. Further, file system cache 126 represents up-to-date data of file system 132 which may not have been flushed to the persistent storage yet. Moreover, I/O operations that writes data to file system cache 126 are uncommitted I/O operations such that the data is eventually flushed the file system cache 126 to file system 132 stored on the persistent storage. Generally, one or more background processes may flush data from file system cache 126 to a persistent storage. A background process includes operations such as block allocation, and changes to metadata structures such as superblock, free block bitmap, inode, indirect blocks and a file system transaction log. Using separate instances of range locks as described above herein according to the current technique enables file server 23 to concurrently execute multiple I/O operations (e.g., asynchronous I/O requests) that write data to file system cache 126 without blocking an ongoing file system operation that may be writing data to a persistent storage at the same time. Further, range lock 124 that is used for writing data to file system cache 126 may be based on a page level granularity (e.g., 8 KB) and range lock 128 that is used for flushing data to a persistent storage may be based on a disk block level granularity (e.g., 8 KB).

In at least one embodiment of the current technique, a write I/O operation modifies on-disk contents of file system 132 stored on a persistent storage. A range lock is acquired in order to modify the on-disk contents of file system 132. If a write I/O request that is directed to a file system block which is not cached in a volatile memory (e.g. file system cache 126) of file server 23, the write I/O request performs operations such as reading contents of the file system block from a persistent storage, modifying the contents based on the write I/O request and writing the modified contents to the persistent storage. If a write I/O request is directed to a file system block that does not exist on a persistent storage yet, the write I/O request allocates a new data block and copy data associated with the write I/O request to the newly allocated data block. If a write I/O request is an asynchronous I/O operation, an acknowledgement is returned to a client as soon as data is written to file system cache 126. The flushing of data to file system 132 stored on a persistent storage is delayed until a specific criteria (e.g., threshold) is met. Thus, a write latency indicating an amount of time it takes to write data is reduced by delaying writing data to a persistent storage at a later time.

Further, the flushing of data to file system 132 may be performed by one or more background process (e.g. threads). If a write I/O request is a stable write request, the write I/O request performs flushing of data while holding range lock 124. On the other hand, if a write I/O request is an unstable write request, a background process performs flushing of data at a later time after releasing range lock 124.

In at least one embodiment of the current technique, the process of flushing data commits the data from dirty buffers cached in file system cache 126 to file system 132 stored on a persistent storage. A new overlapping write I/O request to any one of the dirty buffers may generate a copy of the dirty buffer to which the overlapping write I/O request is targeted to. Then, the new overlapping write I/O request updates the copy of the dirty buffer in order to ensure that only the data that has been acknowledged to a client is written to the persistent storage. Further, write I/O requests are queued in an order the write I/O requests have been issued when data associated with the write I/O requests is flushed to a persistent storage. Further, data associated with the non-overlapping write I/O requests may be flushed concurrently such that the data is written to different regions of a file system without waiting for any other write I/O to finish executing. However, data associated with the overlapping write I/O requests must be flushed in an ordered arrangement such as the sequence in which the overlapping write I/O requests have been issued by clients.

In at least one embodiment of the current technique, an uncached write I/O request acquires range lock 128 such that any other cached or uncached write I/O request is unable to make any updates to overlapping region of file system 132. Further, an uncached write I/O request that is not aligned based on a size of a sector reads a data block from a persistent storage such that the data block includes a region of file system 132 to which the uncached write I/O request is directed to. The data block is then modified based on the uncached write I/O request.

Further, in at least one embodiment of the current technique, cached multi-threaded read/write interface 122 permits reads and writes to the file system cache 126 using range lock 124. If data to be accessed by a cached read I/O request does not reside in the cache 126, data is staged from the file system 132 to the file system cache 126. The data written to the file system cache 126 by the cached multi-threaded read/write interface 122 is written down to the file system 132 during a commit operation. The file data is written down to a persistent storage first, followed by writing of new file metadata to the log 134 and then writing of the new metadata to the file system 132. The uncached multi-threaded write interface 120 is used for sector-aligned writes to the file system 132 using range lock 128. Sectors of data (e.g., 512 byte blocks) are read from message buffers that are received from a network and written directly to the cached disk array 19. For example, in file server 23, each file block may be sector aligned and 8 Kilobytes (KB) in length. When a sector-aligned write occurs, any cached blocks in the file system cache 126 that include the sectors being written to are invalidated. In effect, the uncached multi-threaded write interface 120 commits file data when writing the file data to the file system 132. The uncached multi-threaded write interface 120 allows multiple concurrent writes to the same file. If a sector-aligned write changes metadata of a file such as file block allocations, data of the file is updated, then the new metadata is written to the log 134, and the new metadata is then written to the file system 132. The new metadata includes modifications to the inode of a file, any new or modified indirect blocks, and any modified quota reservation. The uncached read interface 130 reads sectors of data directly from the file system 132 into message buffers. For example, a read request must have a sector aligned offset and specify a sector count for the amount of data to be read. The data can be read into multiple message buffers in one I/O operation so long as the sectors to be read are in contiguous file system blocks. Typically, the cached multi-threaded read/write interface 122 is used for reading data from read-write files and from any read-only snapshot copies of the read-write files. The uncached multi-threaded write interface 120 is used for sector-aligned writes to read-write files. If the writes are not sector aligned, then the cached multi-threaded read-write interface 122 is used. The uncached read interface 130 is used for sector-aligned reads when there is no advantage to retaining the data in the file system cache 126; for example, when streaming data to a remote copy of a file. From a perspective of a client, a write I/O operation performed by the uncached multi-threaded write interface 120 is a synchronous operation. A synchronous write I/O operation (also referred to as "stable write") does not return an acknowledgement to a client until the data has been written down to the file system 132, and metadata updates has been committed to a persistent storage. Generally, an uncached interface can be turned on or off per file system as a mount-time option. Thus, in at least one embodiment of the current technique, servicing of concurrent read and write requests as described herein prevents writes to a file system from being blocked by other on-going I/O requests.

Further, in at least one embodiment of the current technique, file system cache includes in-memory buffers (such as buffer cache blocks) that are aligned at 8 kilobytes (KB) boundary. If a write I/O request issued by a client is not aligned at 8 KB boundary, a read-modify-write processing reads data from a range of file system 132 in one or more data blocks of size 8 KB each such that the one or more data blocks include data starting at an offset specified by the write I/O request, and the one or more data blocks are updated based on the write I/O request thereby creating a read cache that may be used to process a read I/O request for the range of file system 132.

Figure 6:
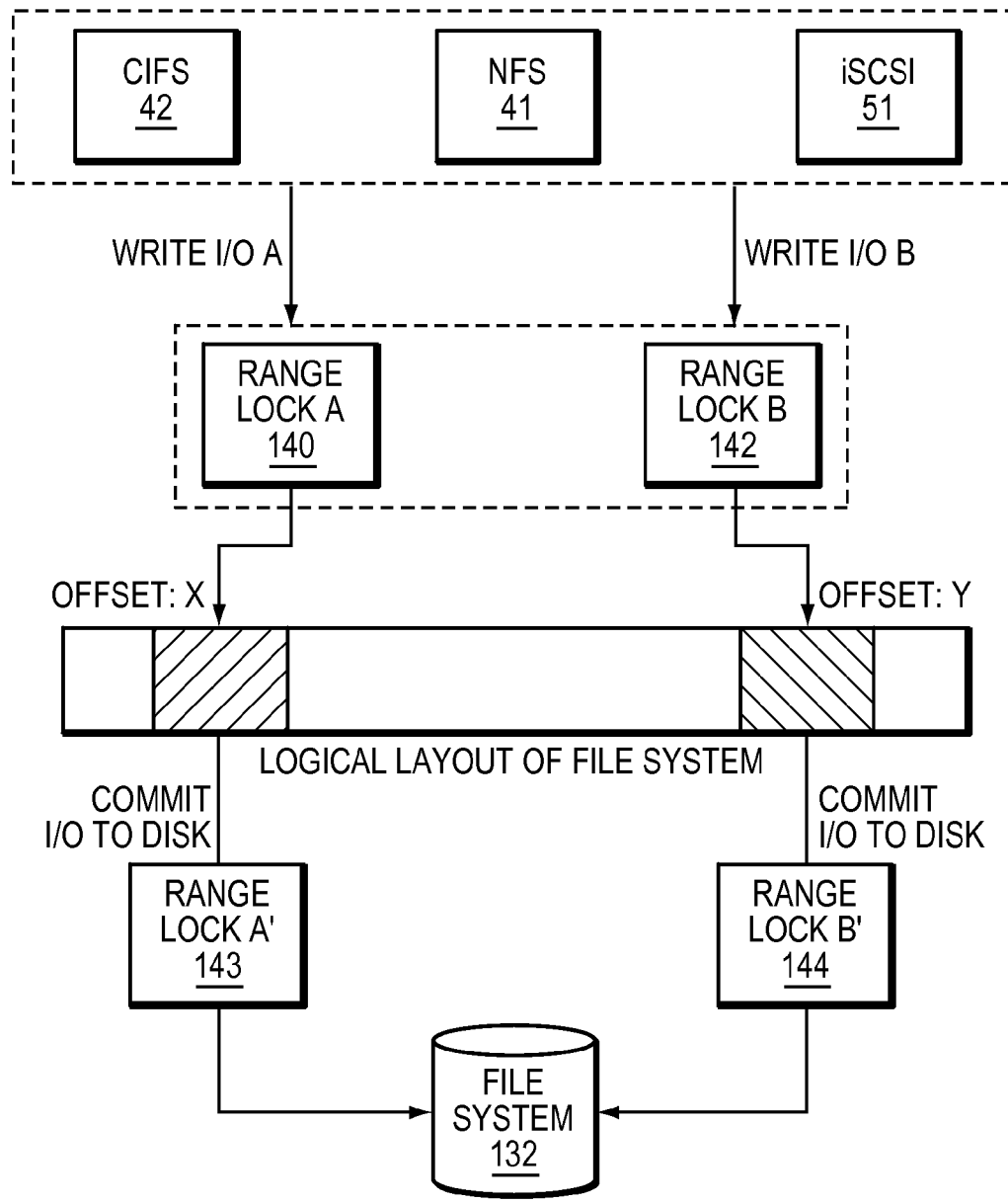

Referring to FIG. 6, shown is more detailed representation of an example sequence of two non-overlapping write I/O requests that are directed to a file system. With reference also to FIG. 5, for example, a client issues a write I/O request A for writing data to file system 132 starting at a file offset X. Another client or the same client issues another write I/O request B for writing data to file system 132 starting at a file offset Y. The write I/O request A acquires the range lock A 140 upon a first range of a file of the file system in the exclusive mode such that the first range includes the file offset X. The write I/O request A then writes data to an in-memory buffer A that represents the first range of the file. The range lock "A" 140 is then released. Similarly, the write I/O request B acquires the range lock B 142 upon a second range of the file of the file system in the exclusive mode such that the second range includes the file offset Y. The write I/O request B then writes data to an in-memory buffer B that represents the second range of the file. The range lock "B" 140 is then released. Therefore, in such a case, the writing of data to the in-memory buffers A and B can occur concurrently because data is written to different portions of file system 132.

In at least one embodiment of the current technique, if a write request I/O request (e.g. write request A, write request B) is a stable write request, data for the write I/O request must be committed to file system 132 stored on a persistent storage (e.g., disk) before an acknowledgement is sent to the client indicating successful completion of the write I/O request. In such a case, the stable write I/O request first checks for conflicts with pending or on-going unstable write requests to the same portion of file system 132. If an I/O is already in progress for the same portion of file system 132, the write I/O request waits for the I/O to finish by using a dependency tree mechanism. Then, data for the write I/O request is committed to the persistent storage using a range lock. For example, range lock A' 143 is acquired in an exclusive mode upon a first portion of file system 132 when committing data of the write I/O request A from the in-memory buffer A to the first portion of file system 132 on the persistent storage. Similarly, range lock B' 144 is acquired in an exclusive mode upon a second portion of file system 132 when committing data of the write I/O request B from the in-memory buffer B to the second portion of file system 132 on the persistent storage. Range locks A' 143 and B' 144 are released after data is committed to the persistent storage.

In at least one embodiment of the current technique, if a write I/O request (e.g. write request A, write request B) is an unstable write request, data for the write I/O request is flushed to file system 132 stored on the persistent storage at a later time using one or more background processes. An acknowledgement is sent to the client indicating successful completion of the write I/O request after data for the write I/O request is written to an in-memory buffer. Further, the in-memory buffer is added to a dirty list after updating metadata information in transaction log 134. For example, a background process acquires range lock A' 143 in an exclusive mode upon a first portion of file system 132 when committing data of the write I/O request A from the in-memory buffer A to the persistent storage. Similarly, another background process acquires range lock B' 144 in an exclusive mode upon a second portion of file system 132 when committing data of the write I/O request B from the in-memory buffer B to the persistent storage. Range locks A' 143 and B' 144 are released after data is written to the persistent storage.

Further, in at least one embodiment of the current technique, if a write I/O request is targeted for a range of file system 132 such that the range is not aligned with the size of a file system data block indicating a partial block write request, a read-modify-write processing reads a portion of file system 132 at the file system block granularity into one or more in-memory buffers and updates contents of the one or more in-memory buffers with data associated with the write I/O request. For example, if the size of a file system data block is 8 Kilobytes (KB), a write I/O request that starts at offset 28672 bytes is a partial block write request. Thus, for example in such a case, if size of the write request is 8092 bytes, two file system data blocks will be read in one or more in-memory buffers such that data is read from the file system starting at offset 24576 bytes and ending at 40959 bytes.

Further, in at least one embodiment of the current technique, for example, if write I/O request A is scheduled to commit data to a range of file system 132 on a disk and during the same time write I/O request B attempts to write data to the same range of file system 132, the write I/O request B may continue execution by creating a copy of the in-memory buffer A that is being written to the disk as part of write I/O request A, and modifying contents of the copy of the in-memory buffer A. Thus, in at least one embodiment of the current technique, concurrent write I/O requests directed to the same region of a file system may execute concurrently in such a way that while one write I/O request is flushing an in-memory buffer to a disk, another write I/O request may write data to a copy of the in-memory buffer. Further, a write order is guaranteed by using a dependency tree mechanism in conjunction with range locks in such a way that for example the write I/O request B flushes contents of the copy of the in-memory buffer B after contents of the in-memory buffer A associated with the first write I/O request A are flushed to the disk. Further, updates to file system cache 126 may use similar serialization mechanism in order to guarantee the write order for overlapping write I/O requests.

Further, in at least one embodiment of the current technique, a read I/O request uses range locks in a similar way as a write I/O request uses the range locks. If a client issues a read I/O request to a portion of a file system on which a write I/O operation is already in progress by acquiring an exclusive range lock upon the portion of the file system, the read I/O request waits until the write I/O request completes execution. Further, a read I/O request uses range locks to read data from a persistent storage into file system cache 126 if the data does not reside in the file system cache 126. Additionally, different ranges of file system cache 126 may be modified concurrently using different range locks that are acquired upon the different ranges of file system cache 126 respectively. Conventionally, a read I/O request must wait until a write I/O request to a file of a file system finishes writing data to the file irrespective of a range of the file to which the write I/O request writes data. By contrast, using the current technique, a read I/O request may read data from a portion of a file of a file system during the time a write I/O request is writing data to a different portion of the file because a separate range lock is used for each portion of the file to which an I/O request is issued to.

Figure 7:
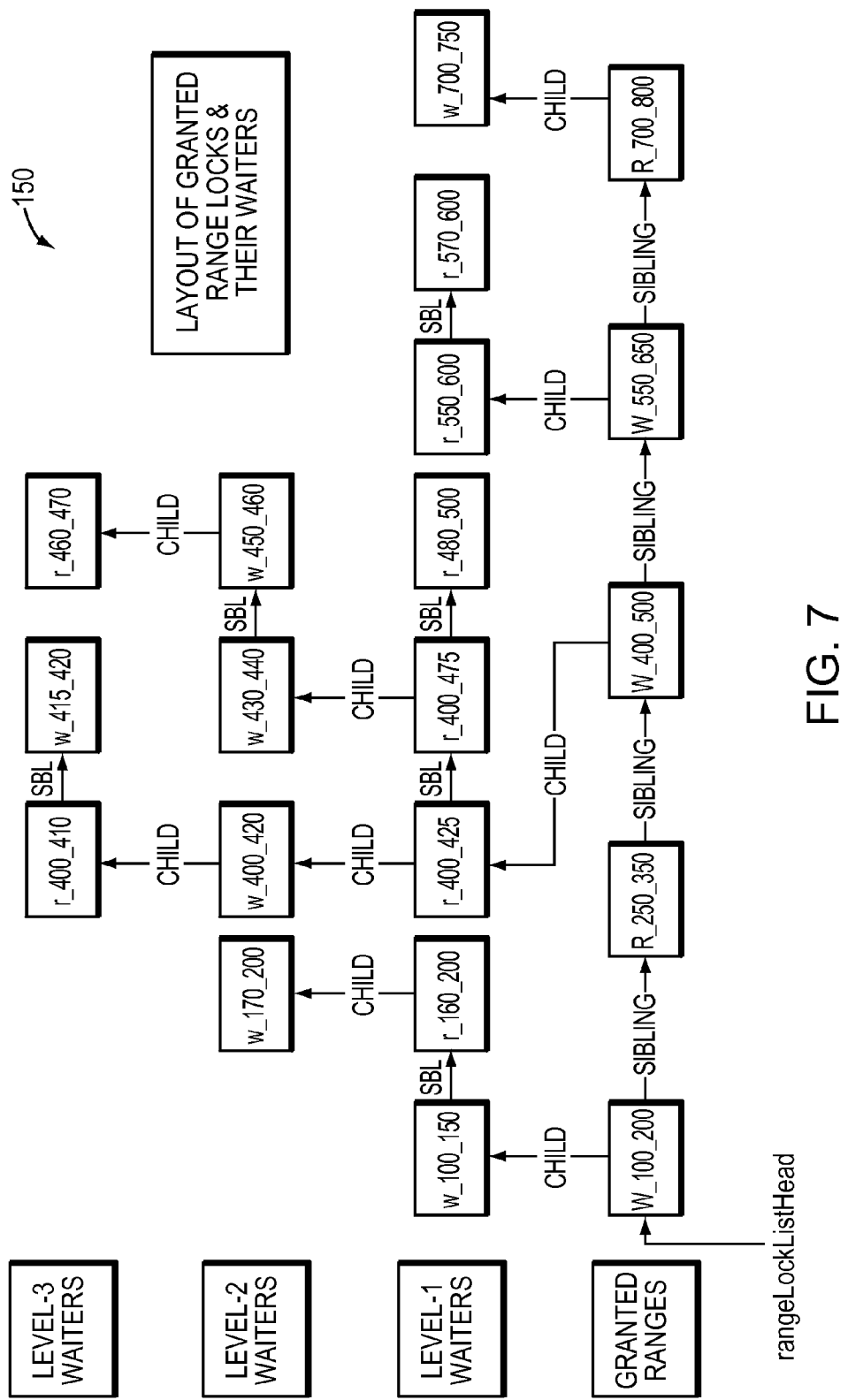

Referring to FIG. 7, shown is a more detailed representation of components that may be included in an embodiment using the techniques described herein. An inode of a file is represented in a memory of file server 23 by an in-memory data structure such as vnode (also referred to as "virtual inode"). A shareable range lock creates a per-vnode range list (also referred to as "granted list") such that each entry of the range list indicates a range that is either locked or granted access in a specific mode (e.g., shared, exclusive). A range lock request received from a client is compared with entries on the granted list as well as ranges that are either blocked or waiting to acquire a lock. Based on the comparison, access to a range of a file associated with the range lock request is granted and information regarding the range is added to the granted list if no conflict is found. However, if a range of the file associated with the range lock request conflicts with either a granted range on the granted list or waiting request for the granted range, the range lock requests waits for the conflict to be resolved and is added to a waiting list for the granted range. Further, a conflict is found between two ranges if first and second range overlaps with each other and an exclusive range lock is acquired upon at least one range out of two. Further, in at least one embodiment of the current technique, each file is associated with a granted range list and one waiting range list is associated with each granted range included in the granted range list. When a range lock associated with a granted range is released, range lock requests (also referred to as "level-1 waiters") that have been waiting on the granted range are unblocked. Then range lock requests (also referred to as "level-2 waiters") that have been waiting on the level-1 waiters are unblocked. Next, range lock requests (also referred to as "level-3 waiters") that have been waiting on the level-2 waiters are unblocked and so on. Each range lock that is unblocked repeats the process to acquire the range lock such that the process of acquiring the range lock may either acquire access to the range associated with the range lock or block again.

In at least one embodiment of the current technique, a dependency tree (also referred to as "dependency graph") is created to track range lock requests waiting on a granted range. All granted ranges are linked together using a range lock list and the granted ranges are referred to as siblings. Each range lock request that is granted access to a range of a file is referred to as a granted range and is added to the range lock list associated with the file. Further, range lock requests that are waiting to access the range of a file associated with a granted range are added as direct or indirect waiters in a dependency tree using a child-sibling relationship such that a child indicates a waiting range lock request for a sibling. Range lock requests that wait on a granted range are referred to as level-1 waiters which are linked using a child-sibling relationship such that a level-1 waiter is referred to as a child of the granted range. Further, each level-1 waiter for a granted range is referred to as the sibling of other level-waiters for the granted range such that a second level-1 waiter of the granted range is referred to as a sibling of a child of the granted range. Similarly, range lock requests that wait on the level-1 waiters are referred to as level-2 waiters which are linked to each other using a child-sibling relationship such that a level-2 waiter is referred to as a child of a child of the granted range. Further, each level-2 waiter of a level-1 waiter is referred to as a siblings of other level-2 waiters such that a second level-2 waiter of a level-1 waiter of the granted range is referred to as a sibling of a child of a child of the granted range. Upon release of the granted range, all level-1 waiters wake up and restart a process to acquire a range of the file. Further, once level-1 waiters are woken up, higher level waiters remain linked to level-1 waiters in the dependency tree such that the higher level waiters follow the level-1 waiters based on whether the level-1 waiters are granted access or blocked again.

Following is a pseudo code of an example data structure that may implement a range lock using the current technique.

```
class RWRange { ...
- RWRange*    next; // list of held range locks
- RWRange*    wLink; // list of waiting requests
-             // only a locked range has wLink != NULL and
-             // request only gets added to the wLink of a locked range
-             // even it may sleep on a different range to avoid starvation
+ // the head of waiting range req list that sleep on this range
+ RWRange*    child;
+ // next range request that sleeps on the same range object as this range,
+ // or point to next granted range if this range is granted
+ RWRange*    sibling;
... }
```

For example, FIG. 7 illustrates an example of a dependency graph of granted and waiting range lock requests. For example, when a range lock for a granted range indicated by "W_400_500" is released, three level-1 waiters waiting for the granted range wake up and all three range lock requests are granted access to the range of a file indicated by the range "W_400_500". However, higher level waiters such as "W_400_420", "W_430_440" remains blocked and do not wake up at the time the three level-1 waiters become granted ranges.

Figure 8:
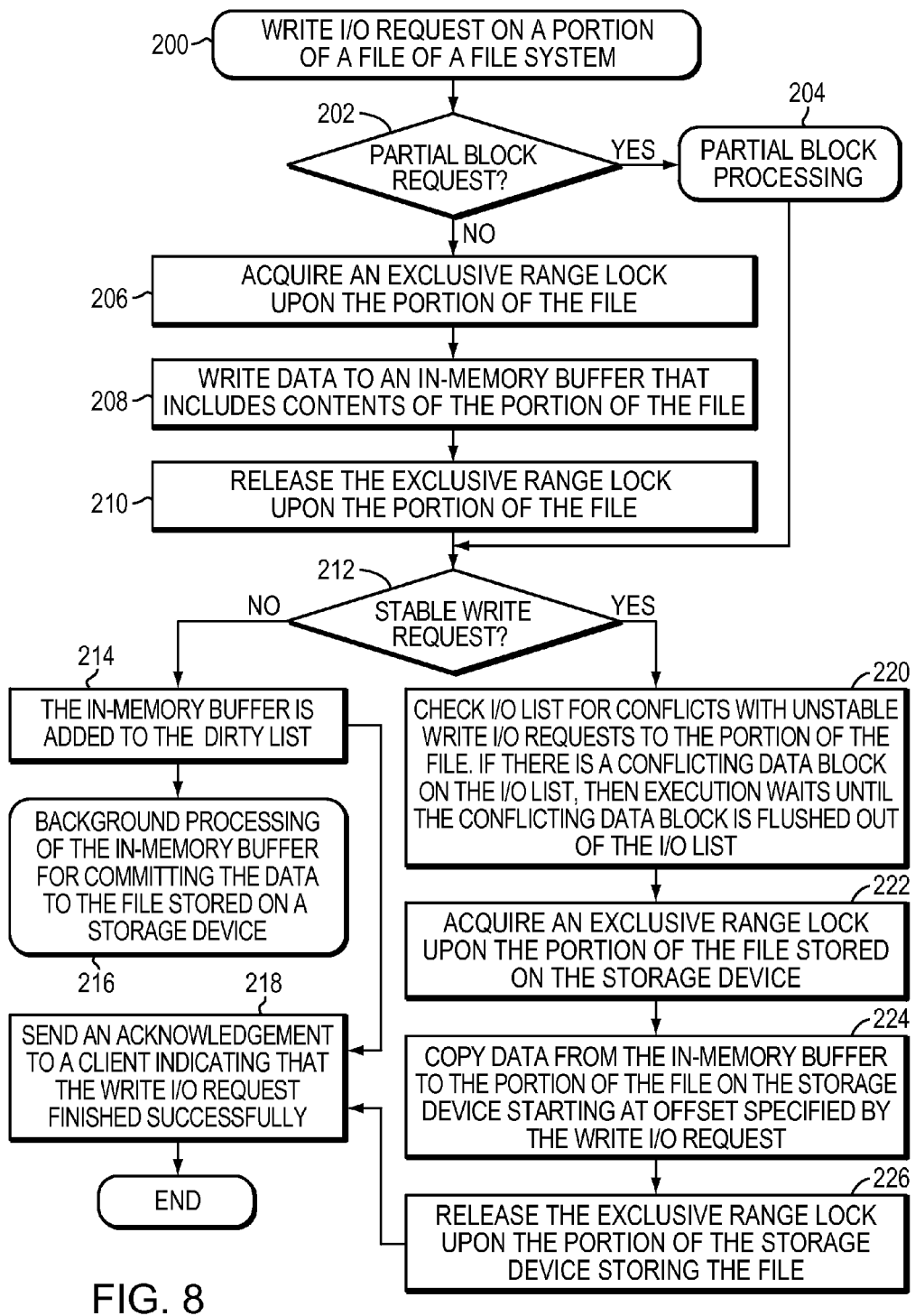
FIGS. 8-12 are flow diagrams illustrating processes that may be used in connection with techniques herein.

Referring to FIG. 8, shown is a flow diagram illustrating a flow of data in the data storage system. With reference also to FIG. 5, in at least one embodiment of the current technique, a client issues a write I/O request directed to a region (also referred to as "portion" or "range" or "part") of a file system (step 200). File server 23 determines whether the write I/O request is not aligned with a size of a file system block indicating that the write I/O request is a partial block I/O request (step 202). If the write I/O request is a partial block I/O request, file server proceeds to perform partial block processing (step 204). If the I/O request is not a partial block request, an exclusive range lock 124 is acquired upon the range of the file system 132 (step 206). Data for the write I/O request is written to an in-memory buffer (e.g., buffer cache block) of file system cache 126 (step 208). The exclusive range lock is released (step 210). File server 23 makes a determination whether the write I/O request is a stable write request (step 212). If the write request is a stable write request, an I/O list is checked for conflicts such that a conflict indicates a pending unstable write I/O request directed to either another range that overlaps with the range of file system 134 or the same range of file system 134. If there is a conflicting data block on the I/O list, the stable write I/O operation waits until the conflicting data block is flushed to a persistent storage (step 220). In other words, in order to serialize a write I/O request with on-going read and write I/O requests, the write I/O request must wait to access a data block that is being accessed by the on-going read and write I/O requests. An exclusive range lock 128 is acquired for the range of file system 132 (step 222). The data from the in-memory buffer is copied to the range of file system 132 on the persistent storage (e.g., storage device, disk) such that the data is written starting at an offset specified by the write I/O request (step 224). The exclusive range lock 128 is released (step 226). A successful acknowledgement is sent to the client indicating that the write I/O request finished successfully (step 218).

However, if file server 23 determines at step 212 that the write I/O request is an unstable write request, the in-memory buffer is added to a dirty list associated with file system 132 (step 214). A successful acknowledgement is sent to the client indicating that the write I/O request finished successfully (step 218). Further, a background process commits the data stored in the in-memory buffer to file system 132 stored on the persistent storage after the successful acknowledgment is sent to the client (step 216).

Figure 9:
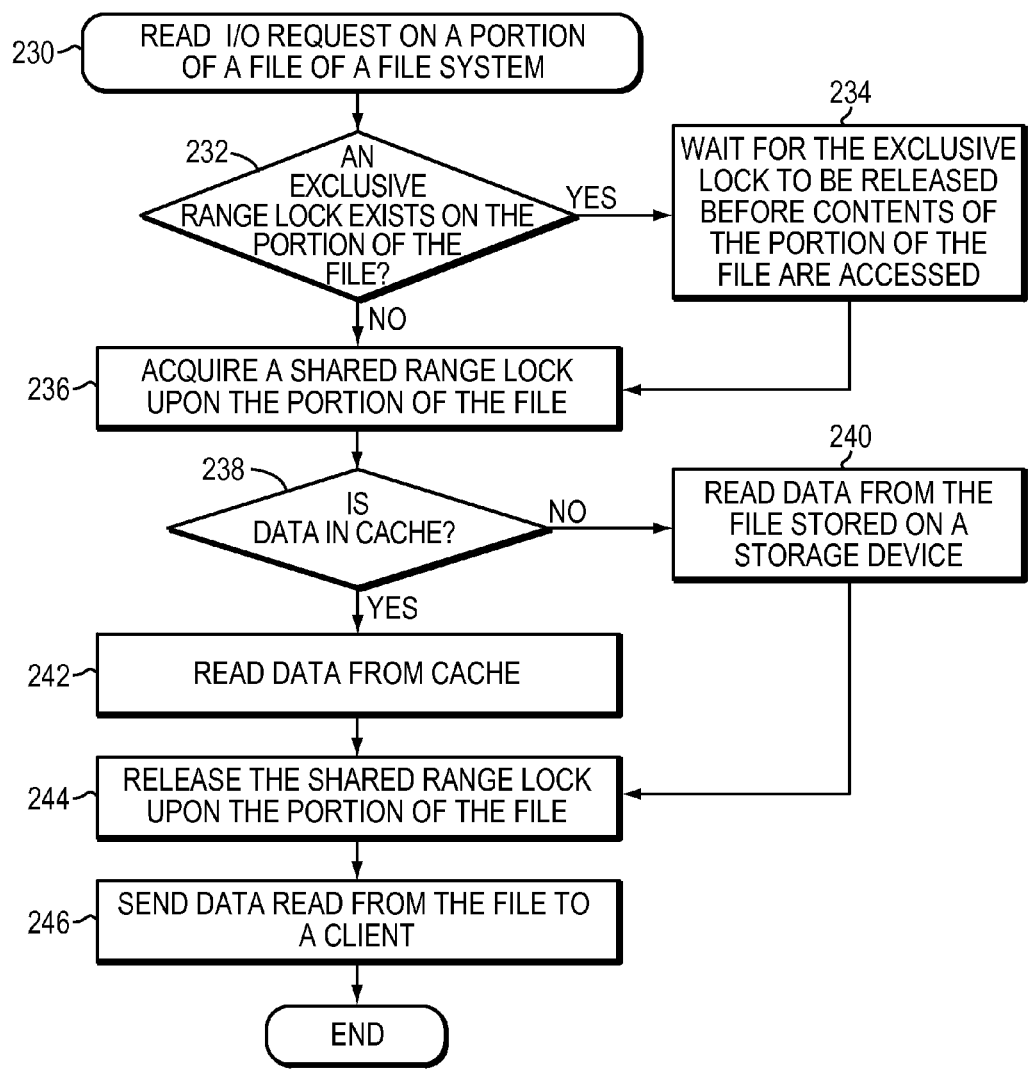

Referring to FIG. 9, shown is a flow diagram illustrating a flow of data in the data storage system. With reference also to FIG. 5, in at least one embodiment of the current technique, a client issues a read I/O request directed to a region (also referred to as "portion" or "range" or "part") of a file system 132 (step 230). File server 23 makes a determination whether an exclusive range lock has already been acquired upon the portion of the file system 132 (step 232). If the exclusive range lock has already been acquired upon the portion of the file system 132, the read I/O request waits for the exclusive range lock to be released before data of the portion of file system 132 is accessed (step 234). However, if no exclusive range lock has been acquired upon the portion of the file system 132, a shared range lock is acquired upon the portion of the file system 132 (step 236). If data stored in the portion of the file system 132 does not reside in file system cache 126 (step 238), the data stored in the portion of the file system 132 is read from a persistent storage (step 240). However, if the data stored in the portion of the file system 132 already reside in file system cache 126 (step 238), the data stored in the portion of the file system 132 is read from the file system cache 126 (step 244). The shared range lock is then released (step 244). The data is provided to the client and the read I/O request completes successfully (step 246).

Figure 10:
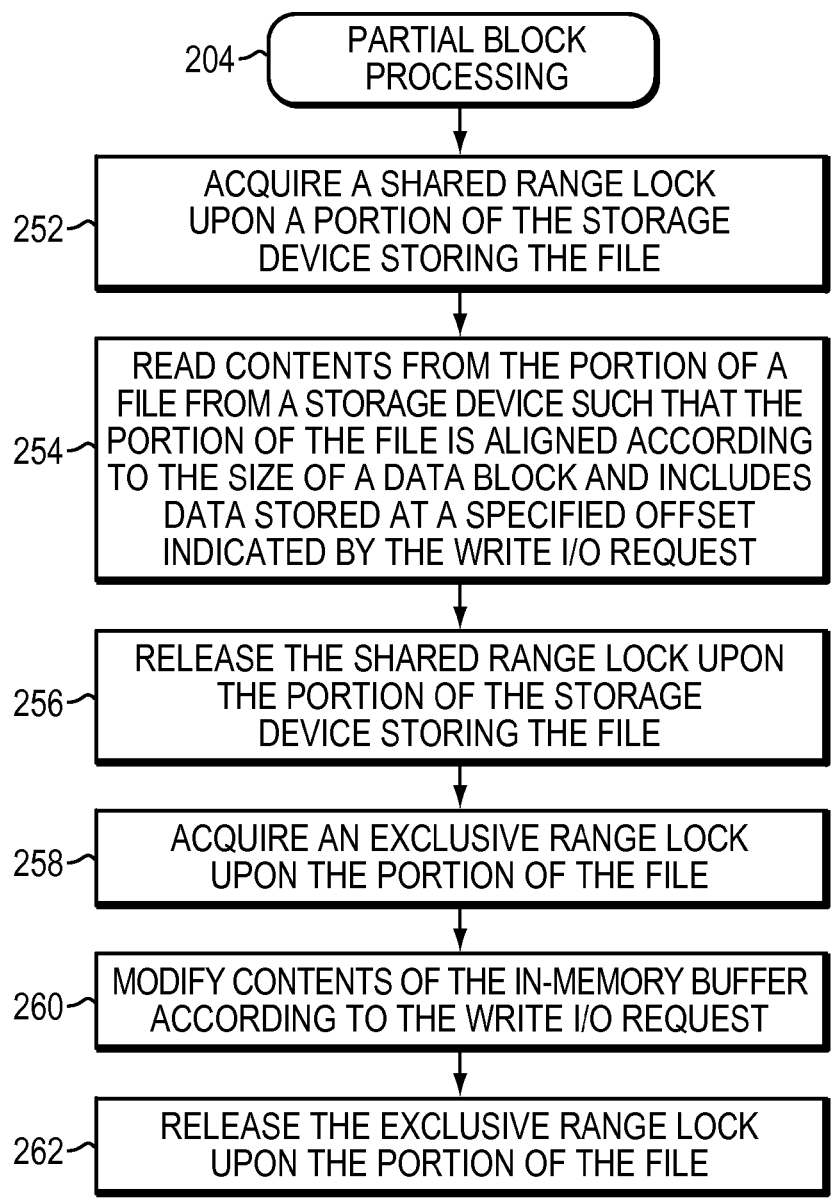

Referring to FIG. 10, shown is a flow diagram illustrating a flow of data in the data storage system. With reference also to FIGS. 5 and 8, partial block processing starts when a write I/O request is not aligned with the size of a file system data block (step 204). A shared range lock 128 is acquired upon a range of file system 132 stored on a persistent storage (step 252). Data is read from a range of file system 132 from the persistent storage into one or more in-memory buffers such that the data read from the range of file system 132 is aligned based on the size of the file system data block and includes data stored at a specified offset indicated by the write I/O request (step 254). The shared range lock 128 is released (step 256). An exclusive range lock 124 is acquired upon the range of file system 132 (step 258). Contents of the one or more in-memory buffers are modified based on the write I/O request (step 260). The exclusive range lock 124 is released (step 262). The write I/O request continues processing from step 212 as illustrated in FIG. 8.

Figure 11:
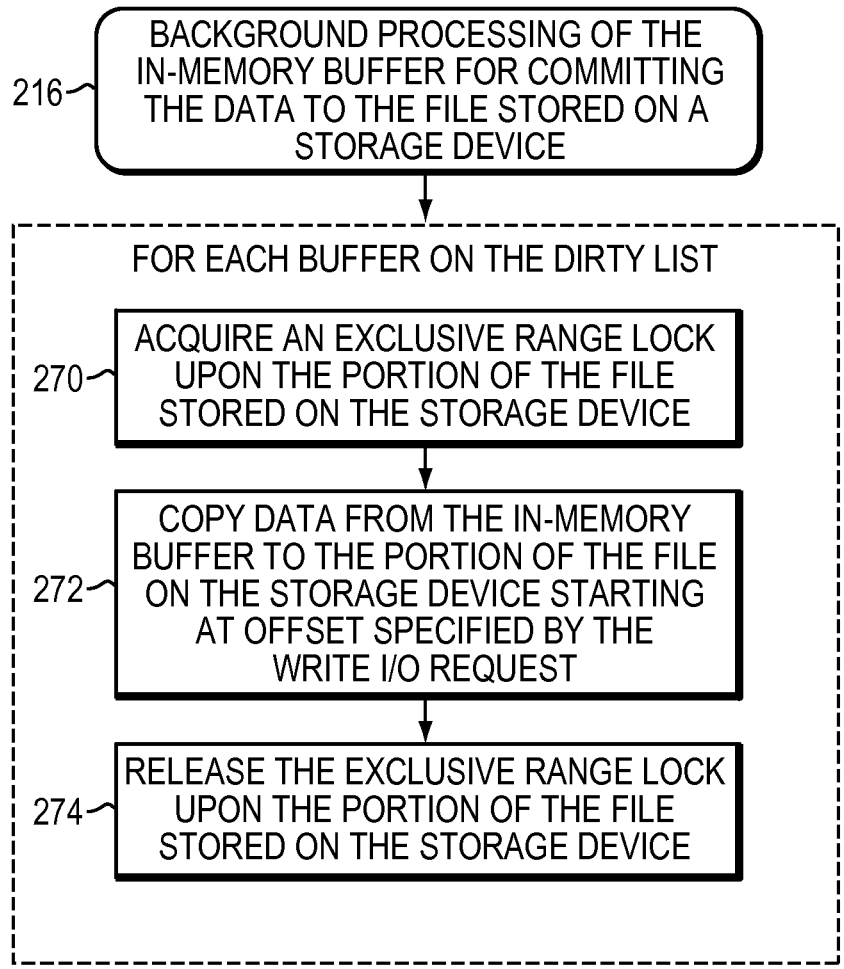

Referring to FIG. 11, shown is a flow diagram illustrating a flow of data in the data storage system. With reference also to FIGS. 5 and 8, in at least one embodiment of the current technique, a background process commits the data stored in an in-memory buffer of file system cache 126 to file system 132 stored on the persistent storage in background (step 216). A dirty buffers list is associated with file system 132 that includes all in-memory buffers that must be flushed by a background process. For each in-memory buffer included in the dirty buffers list, an exclusive range lock 128 is acquired upon a portion of file system 132 stored on the persistent storage (step 270). Data of the in-memory buffer is copied to the portion of file system 132 stored on the persistent storage starting at an offset specified by the write I/O request (step 272). The exclusive range lock 128 is released after the data is flushed to the persistent storage (step 274).

Figure 12:
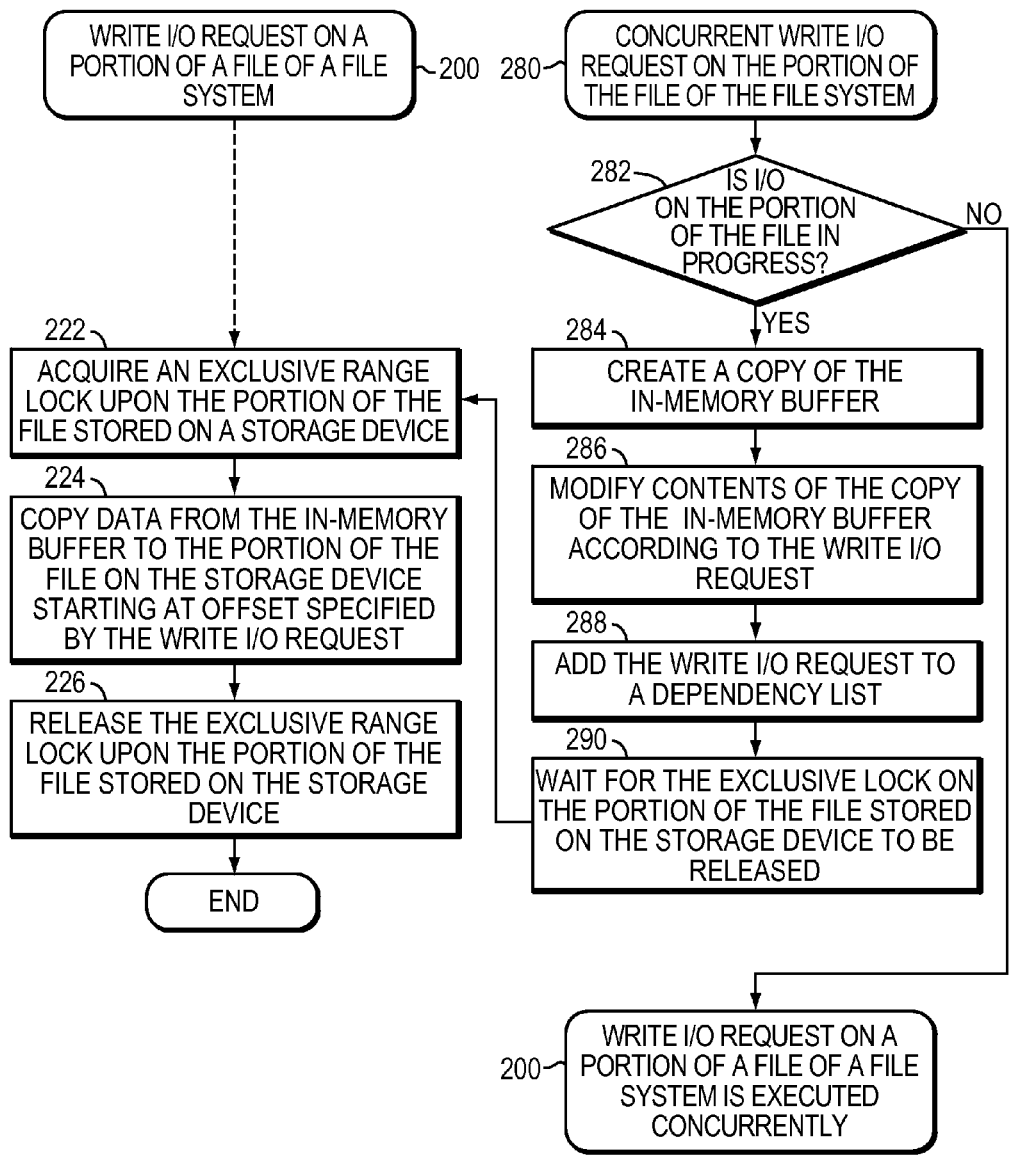

Referring to FIG. 12, shown is a flow diagram illustrating a flow of data in the data storage system. With reference also to FIGS. 5 and 8, in at least one embodiment of the current technique, if a write I/O request is issued for a range of file system 132 by a client during the time when another write I/O request is being executed on file system 132 (step 280), file server 23 determines whether the other I/O request is already in progress such that the other write request is writing data to the same range of file system 132 (step 282). If the other I/O request is in progress for a different range of file system 132 indicating that the write I/O request does not overlap with the other write I/O request, the write I/O request is performed concurrently such that the write I/O request starts writing data to the file system 132 on the persistent storage before the non-overlapping write I/O request finishes writing data to the different range of file system 132. However, if the other I/O operation is in progress on the same range of file system 132 indicating that the other write I/O request overlaps with the write I/O request, a copy of a in-memory buffer associated with the other write I/O request is created (step 284). Contents of the copy of the in-memory buffer are modified based on the write I/O request (step 286). The write I/O request is added to a dependency tree (also referred to as "dependency graph" or "dependency list") because the write I/O request can not proceed further until the other write I/O request to the same region finishes (step 288). The write I/O request waits for the exclusive range lock acquired upon the range of file system by the other overlapping write I/O request to be released (step 290). Once the exclusive range lock is released, the write I/O acquires the exclusive lock upon the range of file system 132 and proceeds to execute the write I/O request as illustrated in FIG. 8 (step 222).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing concurrent I/Os in file systems, the method comprising:

receiving a first and second I/O requests, wherein the first I/O request is directed to a first portion of a file and the second I/O request is directed to a second portion of the file;

obtaining a first range lock for the first portion and a second range lock for the second portion, wherein the first and second range locks provide access to the first and second portions of the file concurrently;

determining whether the first and second portions of the file overlap;

performing the first and second I/O requests concurrently upon determining that the first and second portions of the file do not overlap, wherein the second I/O request starts performing I/O on the second portion of the file before the first I/O request finishes performing I/O on the first portion of the file; and writing data associated with the first and second I/O requests to the file organized on a storage system in an order in which the first and second I/O requests are received upon determining that the first and second portions of the file overlap, wherein data associated with the second I/O request for the second portion of the file is written to a buffer in a memory of the storage system upon determining that flushing of the data associated with the first I/O request is in progress for the first portion of the file.

2. The method of claim 1, wherein performing the first and second I/O requests concurrently further comprising:

writing data of the first I/O request to a first memory buffer and writing data of the second I/O request to a second memory buffer;

releasing the first and second range locks;

determining, based on whether the first and second I/O requests are stable write operations, whether to add the first and second memory buffers to a dirty list; and based on the determination, flushing the first and second memory buffers to the file stored on a storage device.

3. The method of claim 2, further comprising:

receiving a third I/O request, wherein the third I/O request is directed to the first portion of the file;

determining, whether the flushing of the first I/O operation is in progress for the first portion of the file;

based on the determination, creating a copy of the first memory buffer;

modifying the copy based on the third I/O request; and adding the third I/O request to a dependency list.

4. The method of claim 2, wherein the flushing of the first and second memory buffers further comprising:

obtaining a third range lock for the first portion of the file stored on the storage device and a fourth range lock for the second portion of the file stored on the storage device;

copying contents of the first memory buffer to the first portion of the file stored on the storage device and copying contents of second memory buffer to the second portion of the file stored on the storage device; and releasing the third and fourth range locks.

5. The method of claim 1, wherein a range lock protects a portion of the file from conflicting I/O operations, wherein a portion of the file is based on a granularity of a size of a data block.

6. The method of claim 1, wherein a range lock is associated with an access mode, wherein the access mode is selected from the group consisting of an exclusive mode and a shared mode.

7. The method of claim 1, wherein the first and second range locks are organized in a dependency list, wherein the dependency list includes a list of granted ranges and a list of waiting ranges.

8. The method of claim 1, further comprising:
determining, whether the first I/O request is a partial block request;
based on the determination, reading contents of the file in a memory buffer, wherein the contents are aligned based on a granularity of a size of a data block; and
modifying data of the memory buffer based on the first I/O request.

9. The method of claim 1, further comprising:
receiving a read I/O request, wherein the read I/O request is directed to a portion of the file;
obtaining a range lock in a shared mode for the portion of the file;
determining, whether data associated with the I/O request is stored in a cache;
based on the determination, reading the data from the cache; and
releasing the range lock.

10. The method of claim 1, wherein a first set of range locks protects a logical portion of the file stored in a memory buffer and a second set of range locks protects a physical portion of the file stored on a storage device.

11. A system for use in managing concurrent I/Os in file systems, the system comprising a processor configured to:
receive a first and second I/O requests, wherein the first I/O request is directed to a first portion of a file and the second I/O request is directed to a second portion of the file; obtain a first range lock for the first portion and a second range lock for the second portion, wherein the first and second range locks provide access to the first and second portions of the file concurrently;
determine whether the first and second portions of the file overlap
perform the first and second I/O requests concurrently upon determining that the first and second portions of the file do not overlap, wherein the second I/O request starts performing I/O on the second portion of the file before the first I/O request finishes performing I/O on the first portion of the file; and
write data associated with the first and second I/O requests to the file organized on a storage system in an order in which the first and second I/O requests are received upon determining that the first and second portions of the file overlap, wherein data associated with the second I/O request for the second portion of the file is written to a buffer in a memory of the storage system upon determining that flushing of the data associated with the first I/O request is in progress for the first portion of the file.

12. The system of claim 11, wherein performing the first and second I/O requests concurrently further comprising:
write data of the first I/O request to a first memory buffer and writing data of the second I/O request to a second memory buffer;
release the first and second range locks;
determine, based on whether the first and second I/O requests are stable write operations, whether to add the first and second memory buffers to a dirty list; and
flush, based on the determination, the first and second memory buffers to the file stored on a storage device.

13. The system of claim 12, further comprising:
receive a third I/O request, wherein the third I/O request is directed to the first portion of the file;
determine, whether the flushing of the first I/O operation is in progress for the first portion of the file;
create, based on the determination, a copy of the first memory buffer;
modify the copy based on the third I/O request; and
add the third I/O request to a dependency list.

14. The system of claim 12, wherein the flushing of the first and second memory buffers further comprising:
obtain a third range lock for the first portion of the file stored on the storage device and a fourth range lock for the second portion of the file stored on the storage device;
copy contents of the first memory buffer to the first portion of the file stored on the storage device and copying contents of second memory buffer to the second portion of the file stored on the storage device; and
release the third and fourth range locks.

15. The system of claim 11, wherein a range lock protects a portion of the file from conflicting I/O operations, wherein a portion of the file is based on a granularity of a size of a data block.

16. The system of claim 11, wherein a range lock is associated with an access mode, wherein the access mode is selected from the group consisting of an exclusive mode and a shared mode.

17. The system of claim 11, wherein the first and second range locks are organized in a dependency list, wherein the dependency list includes a list of granted ranges and a list of waiting ranges.

18. The system of claim 11, further comprising:
determine, whether the first I/O request is a partial block request;
read, based on the determination, contents of the file in a memory buffer, wherein the contents are aligned based on a granularity of a size of a data block; and
modify data of the memory buffer based on the first I/O request.

19. The system of claim 11, further comprising:
receive a read I/O request, wherein the read I/O request is directed to a portion of the file;
obtain a range lock in a shared mode for the portion of the file;
determine, whether data associated with the I/O request is stored in a cache;
read, based on the determination, the data from the cache; and
release the range lock.

20. The system of claim 11, wherein a first set of range locks protects a logical portion of the file stored in a memory buffer and a second set of range locks protects a physical portion of the file stored on a storage device.

* * * * *